US008713992B2

(12) United States Patent  (10) Patent No.: US 8,713,992 B2
Bengtsson  (45) Date of Patent: May 6, 2014

(54) DEVICE AND METHOD FOR ANALYSING A PERFORMANCE OF AN ENGINE

(75) Inventor: Jorgen Bengtsson, Svanskog (SE)

(73) Assignee: Sem Aktiebolag, Amal (SE)

( * ) Notice: Subject to any disclaimer, the term of this patent is extended or adjusted under 35 U.S.C. 154(b) by 0 days.

(21) Appl. No.: 13/517,920

(22) PCT Filed: Jan. 18, 2011

(86) PCT No.: PCT/SE2011/050050
§ 371 (c)(1),
(2), (4) Date: Jun. 20, 2012

(87) PCT Pub. No.: WO2011/090426
PCT Pub. Date: Jul. 28, 2011

(65) Prior Publication Data
US 2012/0291524 A1  Nov. 22, 2012

(30) Foreign Application Priority Data
Jan. 20, 2010 (SE) ...................................... 1050065

(51) Int. Cl.
*G01L 23/22* (2006.01)
(52) U.S. Cl.
USPC ......................................................... 73/35.08
(58) Field of Classification Search
USPC .................................. 73/35.01, 35.03, 35.08
See application file for complete search history.

(56) References Cited

U.S. PATENT DOCUMENTS

| 4,232,545 A | 11/1980 | Dobler |
| 4,565,087 A | 1/1986 | Damson |
| 4,664,083 A | 5/1987 | Nix |
| 5,040,510 A | 8/1991 | Krebs |
| 5,205,258 A | 4/1993 | Hashimoto |
| 5,781,012 A | 7/1998 | Yasuda |

(Continued)

FOREIGN PATENT DOCUMENTS

| CN | 1920512 A | 2/2007 |
| CN | 102454529 A | 5/2012 |
| EP | 0790409 A | 8/1997 |

OTHER PUBLICATIONS

Examination Report issued in corresponding Australian application No. 2011207854, on May 17, 2013.

(Continued)

*Primary Examiner* — Freddie Kirkland, III
(74) *Attorney, Agent, or Firm* — Jeffrey S. Melcher; Manelli Selter PLLC

(57) ABSTRACT

The present invention relates to a device for analyzing a cylinder wise performance of an internal combustion engine, comprising ion current measurement means that are arranged to measure an ion current in a engine and that are also arranged to produce a first signal corresponding to a measurement performed by said ion current measurement means, and also comprising an amplifier that is connected to said ion current measurement means and that is arranged to receive and amplify said first signal in order to produce an amplified signal, and further also comprising first analyzing means for analyzing said amplified signal for detecting an indication of a knock event in the engine, wherein said amplifier is a variable-gain amplifier and that said device further comprises second analysis means that is arranged to receive and analyze said amplified signal and to adjust a gain of said amplifier. The invention also relates to a method for analyzing a performance of a engine.

20 Claims, 4 Drawing Sheets

(56) References Cited

U.S. PATENT DOCUMENTS

| | | | |
|---|---|---|---|
| 6,151,954 A * | 11/2000 | Aoki et al. | 73/35.08 |
| 6,185,984 B1 | 2/2001 | Takahashi | |
| 6,338,267 B1 * | 1/2002 | Karau | 73/35.03 |
| 6,439,029 B2 | 8/2002 | Asano | |
| 8,365,579 B2 * | 2/2013 | Dierssen et al. | 73/35.01 |

OTHER PUBLICATIONS

Office Action issued in Chinese Patent Application No. 100101, Nov. 12, 2013, pp. 1-8.

Translation of Office Action issued in Chinese Patent Application No. 100101, Nov. 12, 2013, pp. 1-8.

* cited by examiner

DEVICE AND METHOD FOR ANALYSING A PERFORMANCE OF AN ENGINE

TECHNICAL FIELD

The present invention relates to a device for analysing a cylinder wise performance of an internal combustion engine, comprising ion current measurement means that are arranged to measure an ion current in an engine and that are also arranged to produce a first signal corresponding to a measurement performed by said ion current measurement means, and also comprising an amplifier that is connected to said ion current measurement means and that is arranged to receive and amplify said first signal in order to produce an amplified signal, and further also comprising first analysing means for analysing said amplified signal for detecting an indication of a knock event in the engine.

BACKGROUND ART

A generation of a knock event in a engine is a considerable problem, because when an engine knocks it can also cause severe damages on the engine. In an internal combustion engine the air and fuel mixture is introduced into a combustion chamber and then compressed by an ascending movement of a piston, the compressed mixture is fired and combusted by a spark that is generated by applying a high voltage to a spark plug installed in the combustion chamber and the force produced as the piston is pushed down is recovered as work. Occasionally the pressure created by the combustion itself can cause the air and fuel mixture not yet combusted to ignite prematurely, creating a smaller, instantaneous combustion of the end gas that is the cause of the knock event. This condition is not desirable because it can damage or destroy engine parts so it is desirable to prevent the generation of knock event. When combustion is performed in the combustion chamber, molecules of the mixture in the chamber are ionized, so when a measuring voltage is impressed to the spark plug in the combustion chamber, a current, ion current, flows due to the electric charge of the ions. It is known that the ion current changes depending on the combustion pressure and hence, occurrence of a knock (pressure oscillation) can be determined by detecting the signal content of the ion current.

U.S. Pat. No. 6,439,029 discloses a method of detecting an occurrence of a knock event in an internal combustion engine by detecting an ion current from initiation of combustion in a cylinder and judging a knock component overlapping the ion current based on a judging level. This method is, however, not sufficiently accurate if the operation of the engine fluctuates, for example when the engine is exposed to strains or if a new fuel mixture is used. It is hard to get a reliable analysis through this known technique.

U.S. Pat. No. 6,185,984 discloses a device that detects the ion current and then uses algorithms on the filtered signals to judge if a knock event has arisen. This method, however, also lacks the stability needed to yield sufficient results with regards to a knock event at small signal levels normally encountered in lean burn engines.

U.S. Pat. No. 4,565,087 discloses a method and device for detecting a knock event in an internal combustion engine. The method, however, does not take into account the effect of alterations in fuel concentration, or indeed changing fuel altogether, which would result in a different levels of ion current, rendering the detection of a knock event difficult.

Therefore it is obvious that there is a need to find a solution to the above mentioned problems.

DISCLOSURE OF THE INVENTION

It is an object of the present invention to overcome or at least minimise the above mentioned problems. This is achieved by a device according to the preamble of claim 1, wherein said amplifier is a variable-gain amplifier and that said device further comprises second analysis means that is arranged for analysing said amplified signal, wherein said second analysis means is arranged to receive and analyse said amplified signal and to adjust a gain of said amplifier. Thereby, the gain of the amplifier can be sensitively adjusted to create an amplified signal that comprises the necessary information for detecting an engine knock and where the signal level is of a magnitude that is suitable for analysis by the first analysis means, regardless of any variations in the operation of the engine, especially with regards to combustion. It is especially beneficial that the analysis of the second analysing means is performed on the amplified signal without removing low frequencies, such as would be the case by a band pass or high pass filter. Thereby, for the root of the signal is included in the analysis and a suitable amplification of the signal that will allow for a successful knock event detection by the first analysis means can be determined.

According to another aspect of the invention, the second analysis means is arranged to perform an analysis of said amplified signal by comparing at least one property of said amplified signal with at least one reference value, wherein that reference value is at least one property of the engine. Thereby, the detected amplified signal can be compared to reference values regarding the properties of the engine as well as the fuel used with the engine, in order to determine an expected signal level and via a feedback loop adjust the gain of the amplifier to keep the amplified signal at the expected level. Thanks to this, the effects of any alterations with regard to angular velocity of the engine, workload, fuel mixture, etc., can be eliminated and the analysis of the signal always be performed under conditions that allow for a detailed and efficient analysis. Signals that are lower than expected can through this analysis be amplified and signals that are higher than expected can be reduced.

According to still another aspect of the invention, said first signal comprises information regarding a time period corresponding to a section of a revolution of a cylinder of said engine, preferably 0°-90°, more preferably 0°-50°, even more preferably 10°-40° of a crankshaft revolution, and wherein 0° is at a position when a piston of the cylinder is in a top dead centre position. Thereby, only the section of a revolution that comprises the information necessary to determine the presence of a knock event is used for the analysis in the first and second analysis means, starting with the top dead centre position, and no analysis is necessary of other sections of the revolution, where knock event information is lacking.

According to yet another aspect of the invention, said first and second analysing means are arranged to receive at least two, preferably at least four, signals, wherein each signal corresponds to a measurement performed by an ion current measurement means. Thereby, the same components can be used to analyse information from more than one cylinder, preferably all the cylinders of a engine, thus creating the possibility of arriving at a comprehensive image of the performance of the engine with regards to a knock event. Thanks to the aspect described above, where only a section of the revolution of a cylinder is used, the first and second analysis means can be arranged to receive an amplified signal from each cylinder in turn, thereby analysing all the cylinders during each revolution of a first cylinder.

According to a further aspect of the invention, the first and second analysis means are arranged to receive said signals from a plurality of amplifiers, each corresponding to one signal, and wherein said second analysis means is arranged to alter the gain of each of said plurality of amplifiers independent from every other of said plurality of amplifiers. Thereby, a better control of the performance of each cylinder can be achieved by the possibility of altering the amplification of each first signal independently from the other signals in order to deliver a plurality of signals that are adapted to achieve a suitable signal level to the first analysis means for the detection of a knock event.

According to yet another aspect of the invention, the amplified signal is arranged to pass a low pass filter before being received by said second analysis means. Thereby, any disturbances due to differing fuels or fuel mixtures, or due to vibrations in the engine, can be removed before analysis, giving the opportunity to adjust amplification of the first signal continuously to maintain the same relationship between the amplitude of the ion current and the knock event signal.

Many other advantages of the present invention will become apparent from the following detailed description.

BRIEF DESCRIPTION OF THE DRAWINGS

The invention will now be described in more detail with reference to the appended drawings, wherein.

DETAILED DESCRIPTION OF THE INVENTION

Figure 1:
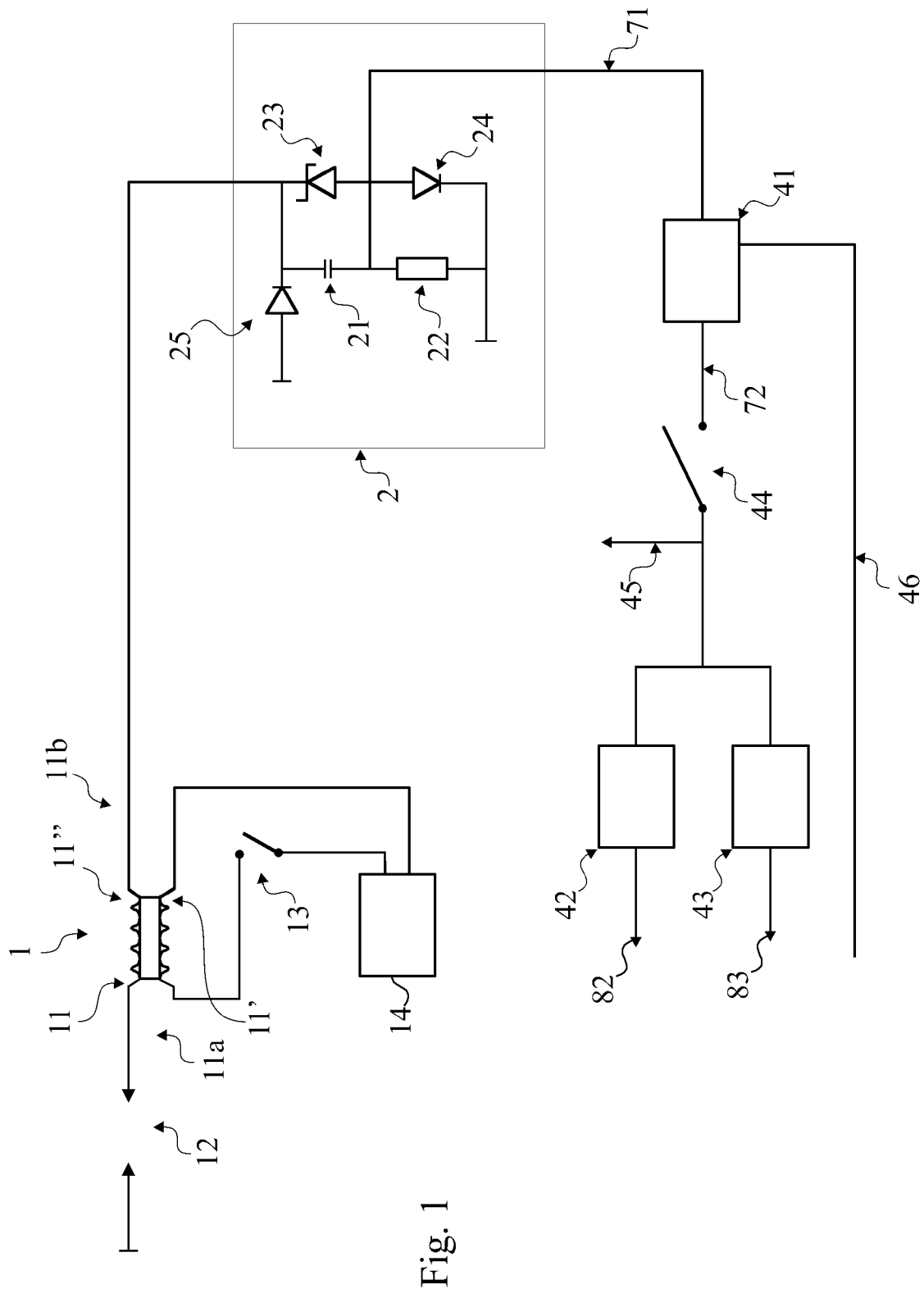
FIG. 1 shows a circuit diagram for a device according to a preferred embodiment of the invention.

In the circuit diagram of FIG. 1, spark generating means 1 is shown comprising a coil 11 with secondary coil 11" that has a first end 11a connected to a spark plug 12 and a second end 11b connected to an ion current measurement means 2. The coil 11 comprises a primary coil 11' to which a current is lead from a power supply 14 such as a battery or a capacitor for inducing a current in the secondary coil 11". A primary switch 13 is used to control the flow of a current in the primary coil 11' and the operation of this switch 13 is determined by a control unit 61 (not shown).

The current that is induced in the secondary coil 11" flows to the spark plug 12, but also to the ion current measurement means 2 that are connected to the secondary coil 11" by its second end 11b. During a spark event, a spark current is created that flows to or from the spark plug and thereby creates a current that in turn induces a second current component at the second end 11b of the secondary coil 11". This current is used to charge a capacitor 21. This current will charge the capacitor to a voltage that equals a Zener voltage. After the spark event, the capacitor voltage will supply a voltage in a range of 60-400 V to a spark gap and if ions are present, an ion current will flow that is further transmitted to an amplifier 41 in the form of a first signal 71. The amplifier 41 is a variable-gain amplifier and amplifies the first signal 71 to form an amplified signal 72.

When a coil select switch 44 is closed, the amplified signal 72 is transmitted towards a band pass filter 42 connected to a first analysing means (not shown) by a first connection 82, and towards a low pass filter 43 connected to a second analyzing means (not shown) by a second connection 83. The first and second analyzing means, respectively, can be used for analysing the amplified signal 72 and yield information regarding the operation of the spark generation means 1 and the combustion, and the second analysing means is arranged to adjust a gain of the amplifier 41 via a third connection 46. The operation of the first and second analysing means will be described in more detail further below.

The spark generating means 1 can comprise a plurality of coils 11, each connected to a power supply 14 and divided by a primary switch 13 each that is connected to the power supply, so that only one primary coil 11' at a time can be used for generating a spark in the spark plug 12 in the active cylinder.

Any sparks generated by the spark plug 12 are used for igniting an air and fuel mixture inside a cylinder 51 (not shown) or a plurality of cylinders 52 (not shown). The timing of the spark is controlled by the control unit 61 (not shown) that controls the connecting of each primary switch 13 that serves to create a current in the secondary coil 11" and thereby generates the spark at the spark plug 12.

Each coil 11 is connected to a separate ion current measurement means 2 and onwards to a separate amplifier 41, and via a fourth connection 45 each such separate amplifier 41 can be connected to the low pass filter 43 and band pass filter 42. Thanks to a coil select switch 44, the operation of the circuits can be controlled so that signals from only one of the separate amplifiers 41 are allowed to reach the low pass filter 43 and band pass filter 42 at the time. Thereby, signals with information regarding ion currents from more than one spark generating means 1 and cylinder 52 can be analysed by the same first and second analysis means, thereby yielding detailed and comprehensive information to a control unit 62, that can be the same unit as the control unit 61 used for controlling the generation of sparks, or can alternatively be a separate control unit.

Preferably, properties of the ion current that can be detected at the second end 11b of the secondary coil 11" are only analysed during a section of a revolution of a cylinder 51, namely during a time interval when a knock event will occur. This section is preferably 0°-90°, more preferably 0°-50°, even more preferably 10°-40° of a revolution of a crank shaft of a cylinder, and it is advantageous if the section starts at a position when a piston of the cylinder 51 is at a top dead centre (TDC) position, thereby giving the position for 0° at this TDC position. Thereby, the analysis that is performed by first and second analysing means uses only the section that comprises the information that is sought, namely the occurrence of a knock event, and this enables the first and second analysing means to analyse signals 72 from more than one cylinder 51, so that the fourth connection 45 and the coil select switch 44 can be operated to allow the amplified signal 72 that is generated from the performance of a specific coil 11 to reach the analysing means during this section of the revolution. The analysing means can thereby receive signals 72 from a plurality of amplifiers 41 and arrive at a comprehensive analysis regarding most or all of the cylinders 51 in a specific engine.

Figure 2:
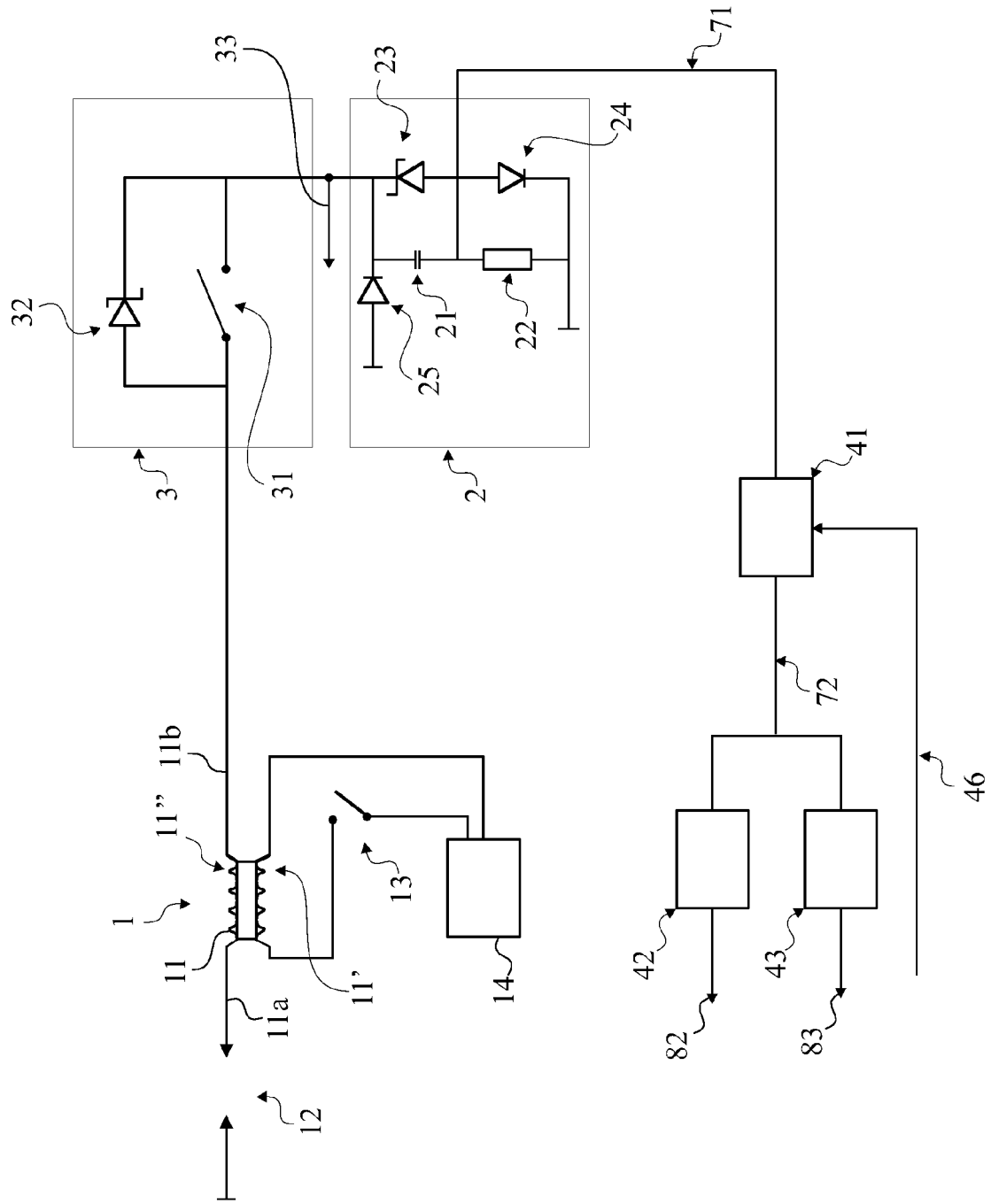
FIG. 2 shows a circuit diagram of a first alternative embodiment of the device of the invention.

In FIG. 2, a first alternative embodiment of the invention is shown, with some alterations to the circuit. Here, the ion currents from each coil 11 are connected before the ion current measurement means 2, thereby reducing the number of components needed for the circuit since only one such ion current measurement means 2 is required as opposed to one for each coil 11 as shown by the preferred embodiment of FIG. 1 above. A connection 3 is therefore provided, comprising an ion current switch 31 placed before a fifth connection 33 through which currents from every coil 11 can be connected and led towards the ion current measurement means 2. Since the voltage at the second end 11b of the coil 11 can fluctuate quickly and also be of a significant size, a zener diode 32 is placed for the protection of the ion current switch 31.

Figure 3:
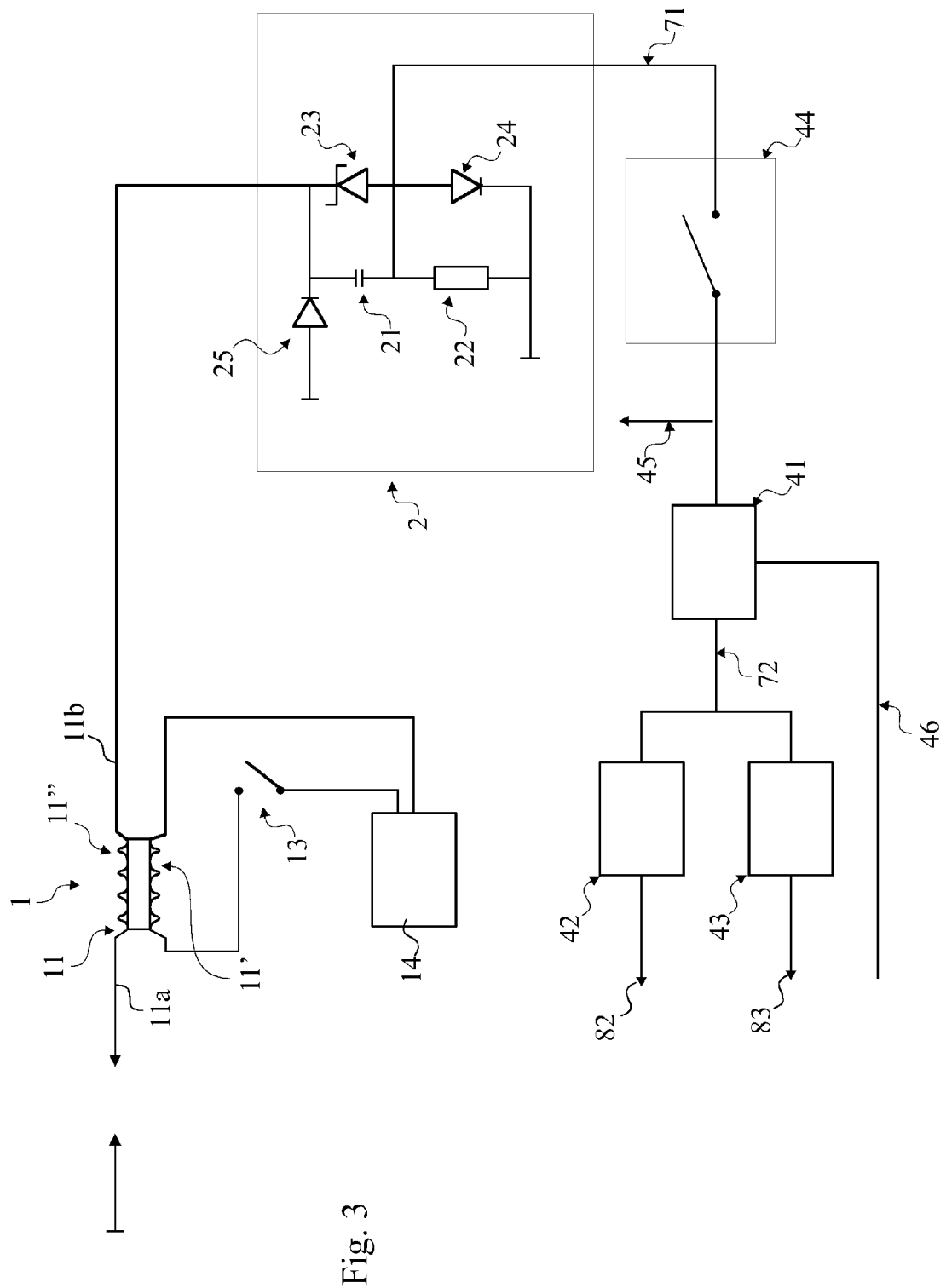
FIG. 3 shows a circuit diagram of a second alternative embodiment of the invention.

In FIG. 3, a second alternative embodiment of the invention is shown. In this embodiment, each coil 11 is provided with an ion current measurement means 2 as in FIG. 1, but only one amplifier 41 is used to amplify the signals 71 created by each ion current measurement means 2. By using a series of ion voltage switches 44, one of which is shown in FIG. 3, and a fifth connection 45 that connects the amplifier to the other switches 44 in the series, the amplifier 41 can receive input from one of the ion current measurement means 2 at a time and transmit an amplified signal 72 to the first and second analysis means 82, 83, respectively. According to this embodiment, only one amplifier 41 is enough for amplifying signals from every coil 11.

One particular advantage of the preferred embodiment shown in FIG. 1 is that the signals 71 generated by an ion current at each of the coils 11 are not connected until after an amplification generating amplified signals 72, thereby significantly reducing the sensitivity of the signals 72 since a driving impedance is significantly lowered. The coil select switch 44 for each amplifier 41 is also at signal voltage levels of around 10V, which allows for a robust and reliable transmission of the amplified signals 72. Also, all the components in the circuit up to and including the amplifier 41 and possibly also the coil select switch can be placed inside a casing of the coil 11, thereby further reducing a sensitivity to disturbances around the signal line. Another particular advantage of this embodiment is the possibility of altering the gain of each amplifier 41 differently depending on the performance of each separate cylinder 51 so that the first signal 71 from one particular cylinder 51 is amplified with regard to the performance and conditions of this particular cylinder rather than a mean value of the performance of all the cylinders 51. This further enables a detailed and reliable analysis at the first analysis means and thereby a more stable performance of the engine.

The first alternative embodiment shown in FIG. 2 connects the coils before the ion current measurement means 2, thereby significantly reducing the number of components needed and allowing for a smaller and less complex circuit. The ion current switch 31 needed would, however, be able to withstand voltage changes of up to 400V without affecting small currents, and this could be expensive and possibly means a generation of undesirably large disturbances to the ion current.

The second alternative embodiment shown in FIG. 3 requires only one amplifier 41 for amplifying all the signals required for the first and second analysis means 82, 83, but the ion voltage switch cannot be allowed to generate too large a disturbance to the signal 71.

Figure 4A:
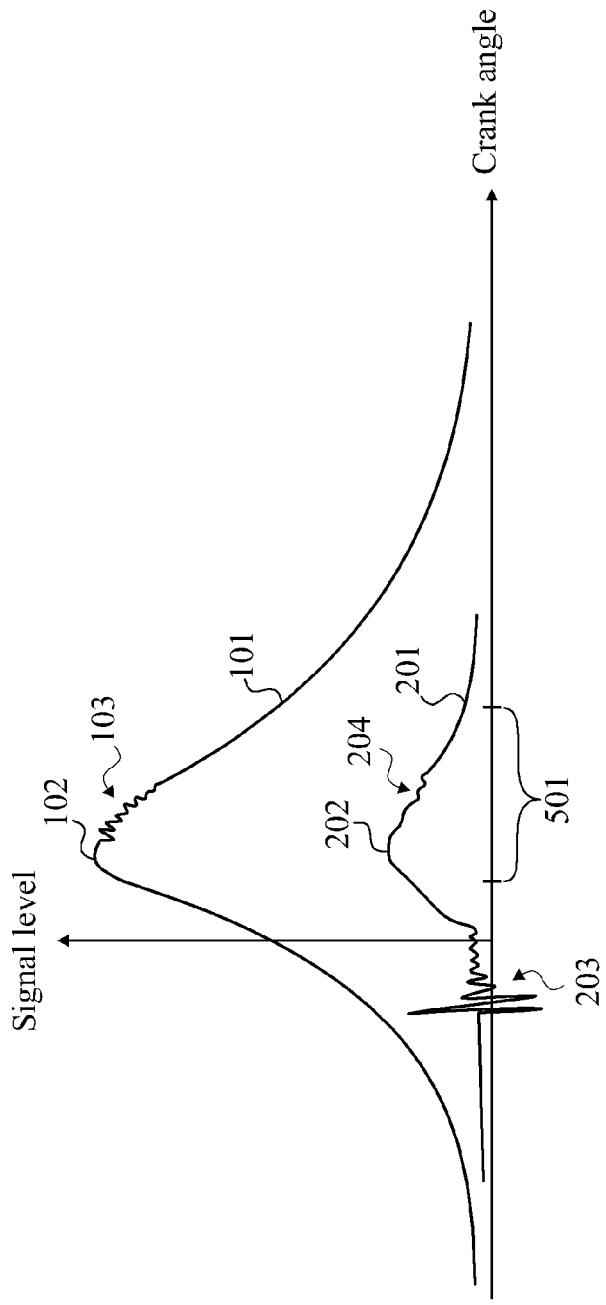
FIG. 4a shows a diagram of a signal generated by the device of FIG. 1.

In FIG. 4a, a signal level of the amplified signal 72 is shown in relation to a crank angle of a cylinder 51, i.e. the angle of revolution, starting from a top dead centre (TDC) position, of a crank shaft within said cylinder 51. A first curve 101, that is approximately Gaussian in shape, shows a cylinder pressure that increases to a first peak value 102 after the TDC position and afterwards decreases and fades. During the first part of a descent after the peak 102, a first oscillation 103 can be seen, corresponding to the effects on cylinder pressure of a knock event.

A second curve 201 shows an ion current corresponding to the amplified signal 72, where a second peak 202 that corresponds to the first peak 102 can be seen. The second curve 201 is generally smooth, but has a second oscillation 203 before the TDC position, i.e. before the cylinder 51 reaches its TDC position. This second oscillation 203 shows the creation of a spark to ignite a fuel mixture inside the cylinder 51. After the second peak 202, a smaller third oscillation 204, corresponding to the first oscillation 103 of the first curve 101, shows a fluctuation in the ion current corresponding to a knock event. A measurement window 501 along the axis showing a crank angle can also be seen, showing the section of a revolution that is analysed by first and second analysis means according to the invention.

Figure 4B:
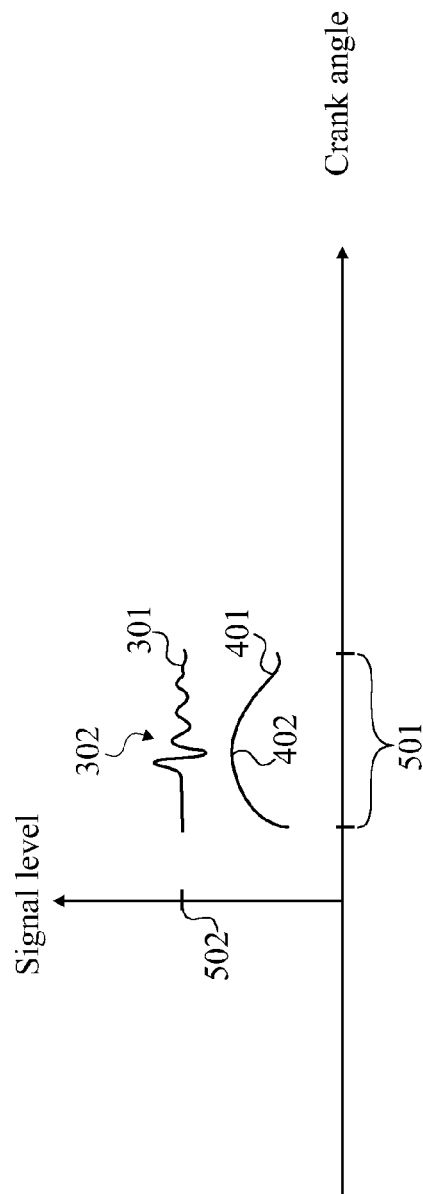
FIG. 4b shows a second diagram of a signal generated by the device of FIG. 1.

FIG. 4b shows the signals that are fed to the first and second analysis means with the signal level plotted against a crank angle, similar to FIG. 4a. A third signal 301 shows the amplified signal 72 after passing the band pass filter 42. The band pass filter 42 can be designed to eliminate all frequencies except those in the interval 5-20 kHz, where an oscillation due to knock event will most likely appear. The amplified signal 72 has thereby been filtered is now essentially flat on a zero level 502 shown along the signal level axis, or y-axis, and shows a fourth oscillation 302 corresponding to a knock event clearly. This third curve 301 is used by the first analysis means for determining the presence of a knock event at the cylinder 51, and this result can be arrived at by analysing the fourth oscillation 302 to determine its magnitude and energy. It can be decided whether this magnitude or energy exceeds a threshold value 503 (not shown), based on known parameters for the engine itself, and if that is the case, it is decided that a knock event has occurred. One knock event in itself is generally not damaging to a engine, but if several knocks occur during a short period of time, the risk for damages, lowering of a performance of the engine, or decreasing the life time of the components, arises. Therefore, the first analysis means can be arranged to use several engine cycles to determine a mean value of the oscillation to show whether a knock event occurs often and therefore needs to be counteracted.

If it is decided by the first analysis means that a knock event generally appears, a first step towards eliminating the knock event can be to alter the timing of the spark generation in such a way that the spark is created at a crank angle that is 3-5° later than before, and the amplified signal 72 analysed again in order to detect if the knock event still occurs in the cylinder 51. If that is the case, the spark can be generated even later, but if the knock event has now disappeared, the operation of the engine can be further optimised by restoring the spark timing to some degree, perhaps 0.05-1° for each engine cycle, until a time and position for the spark is found where the engine can operate at its best and without the generation of knock event. In order to further minimise the knock event, different methods of altering the conditions of the engine, such as supplying a richer fuel/air mixture or increasing the air supply, can be applied depending on a stochiometric condition of the engine and what is suitable at the time, for instance for cooling the cylinder 51.

Of course, other methods then those suggested here can be used to eliminate the knock event after it has been detected within the scope of the invention, as will be readily understood by the man skilled in the art.

FIG. 4b also shows a fourth curve 401 corresponding to the amplified signal 72 after passing the low pass filter 43. Any disturbances due to knock event have now been eliminated and only relatively low frequencies are allowed to pass. The cut-off frequency of the low pass filter is preferably in the interval 700 Hz-2 kHz, more preferably 1 kHz. By determining the signal level at a fourth peak 402 and the position of this peak 402, it can be decided by the second analysis means whether the amplified signal 72 is large enough to allow for a good enough analysis by the first analysis means in order to detect the knock event. If the signal level at the peak 402 is too low, there is a risk that the analysis by the first analysis means would not be of sufficient quality to determine with accuracy the magnitude of the disturbance detected, and to improve the quality the amplification of the first signal 71 that reaches the amplifier 41 would have to be increased. In order to solve this problem, the second amplification means can use the third connection 46 to alter the gain of the amplifier 41 and thereby adapt the amplified signal 72 to facilitate the analysis by the first analysis means. Conversely, if the signal level at the peak 402 is determined to be too high, the second amplification means can lower the gain of the amplifier 41 to create an amplified signal 72 that has a lower peak 202. The ability to thus adapt the amplified signal 72 to fit into a measuring range where the analysis can be optimised to yield as good an analysis as possible is a significant advantage of the present invention.

If the analysis by the second analysis means were to be performed on the band pass filtered signal being fed to the first analysis means, the results for adjusting the gain of the amplifier 41 would not be sufficient to allow for a good operation of the device according to the invention. Since the band pass filtered signal lacks the low frequencies associated with the root of the signal, namely frequencies below 1 kHz, preferably below 700 Hz, any disturbances occurring due to vibrations in the engine, alterations to the fuel mixture or the like, would cause the analysis by the second analysis means to be unsuitable for adjusting the gain of the amplifier 41 in an optimal way. As a result, the analysis by the first analysis means of the amplified signal 72 would be unsuccessful in detecting a knock event and might possibly falsely interpret other events, such as change in fuel and additives, as knock events. Conversely, the knock event itself could be undetectably due to the presence of disturbances to the amplified signal 41, either way giving unsatisfactory results.

By using reference values to determine an appropriate amplification for the engine at any given time, the second analysis means can further adapt the amplified signal 72 to be suitable for analysis by the first analysis means. Since any changes in crank shaft speed, spark timing or in the fuel mixture used, for instance, can have a significant impact on an ion current created inside the cylinder 51, the use of reference values for the present conditions for comparison with the actual amplified signal 72 enables the second analysis means to adapt the amplified signal 72 to suitable levels for further analysis. Other examples of reference values suitable for use with the analysis according to the invention are properties of the cylinder or the engine itself, such as construction details, as well as values showing a work performance under different loads, or more detailed information regarding the performance of the engine with different fuel mixtures at different engine load and crank shaft speed and different temperatures. Thanks to this feedback system, a good signal to noise-ratio can be kept throughout.

If the fuel is changed, for instance from isooctane to ethanol, the level of ion current also changes to four times the previous level. A 20% change in air/fuel ration would also give a similar change, as would altering the load of the engine, while adding fuel additives used for lubrication and octane boost would increase the signal level more than ten times. All these factors would affect the level of ion current, and thereby the signals sent to the analysing means, in such a way that an analysis of the signal would be increasingly difficult but for the possibility of varying the gain, as described above.

The operation of the device will now be described with reference to the FIGS. 1-3 and also to FIG. 4a and FIG. 4b.

During the operation of a engine with multiple cylinders 51, sparks are generated by a spark generating means 1 belonging to each of the cylinders 51. The timing of the sparks are determined by a control unit 61 that can control the operation of all the cylinders simultaneously and can also receive input from the first analysing means as well as the second analysis means.

As the piston moves, ion currents are periodically created after the ignition and can be detected by the secondary coil 11" and transferred to the ion current measurement means, where they are transformed into a signal 71 that can be amplified by the amplifier 41 in order to reach a level where it can be analysed by the first and second analysis means. Amplified signals 72 that originate from ion current generated at different cylinders 51 can be transmitted to the first analysis means and the second analysis means. At the first analysis means, the presence of a knock event can be detected by the methods described above, and the conditions regarding the timing of a spark generation or the working parameters of the cylinder 51 can be altered accordingly in order to eliminate the knock event and thereby optimise the performance of the cylinders 51. The second analysis means receives the same amplified signal 72, filtered through the low pass filter 43, and serves to analyse and compare the filtered signal with reference values regarding the engine and its operation, as well as data regarding the preferred operation range of the first analysis means, in order to determine a signal level that is the most suitable to the first analysis means. The gain of the amplifier 41 is adjusted accordingly, to further facilitate the operation of the first analysis means and thereby the operation of the engine itself.

The control unit 61 can be a separate unit or can be integrated with one or more of the first and second analysis means, and it is easily realised by the man skilled in the art that the same applies to the other components of the circuits shown in FIG. 1-3. Practically all the components can be integrated to form a single unit, but can also be kept separate to form sub-circuits if this is deemed more suitable. The available space near the cylinders 51, along with the properties of the different components used will be significant in determining how best to realise the circuit.

The invention is not to be seen as limited by the embodiments described above but can be varied within the scope of the appended claims, as will be readily apparent to the man skilled in the art. For instance, the construction of the circuits can be altered as well as the nature of the components used, and many other variations are also possible.

The invention claimed is:

1. A device for analysing a cylinder wise performance of an internal combustion engine, comprising:
   ion current measurement means that are arranged to measure an ion current in a engine and that are also arranged to produce a first signal corresponding to a measurement performed by said ion current measurement means;
   an amplifier that is connected to said ion current measurement means and that is arranged to receive and amplify said first signal in order to produce an amplified signal;
   first analysing means for receiving and analysing said amplified signal for detecting an indication of a knock event in the engine, wherein said first signal is arranged to also include low frequencies, said amplifier is a variable-gain amplifier; and second analysis means that is arranged to receive and analyse said amplified signal and to adjust a gain of said amplifier.

2. A device according to claim 1, wherein said second analysis means is arranged to perform an analysis of said amplified signal by comparing at least one property of said amplified signal with at least one reference value.

3. A device according to claim 2, wherein said at least one reference value is at least one property correlated to a performance of the engine.

4. A device according to claim 2, wherein said at least one reference value is a property of a cylinder of said engine or a property of a fuel that is used in said engine.

5. A device according to claim 1, wherein said first signal comprises information regarding a time period corresponding to a section of a revolution of a crank shaft of said engine.

6. A device according to claim 5, wherein said crank shaft being positioned at a top dead center position corresponds to a 0° position.

7. A device according to claim 1, wherein said first signal comprises information regarding a time period corresponding to 0°-90° of a revolution of a crank shaft of said engine.

8. A device according to claim 1, wherein said first signal comprises information regarding a time period corresponding to 0°-50° of a revolution of a crank shaft of said engine.

9. A device according to claim 1, wherein said first signal comprises information regarding a time period corresponding to 0°-40° of a revolution of a crank shaft of said engine.

10. A device according to claim 1, wherein said first and second analysing means are arranged to receive at least two amplified signals wherein each amplified signal corresponds to a measurement performed by an ion current measurement means.

11. A device according to claim 1, wherein said first and second analysing means are arranged to receive at least four amplified signals wherein each amplified signal corresponds to a measurement performed by an ion current measurement means.

12. A device according to claim 10, wherein the first and second analysis means are arranged to receive said signals from a plurality of amplifiers, each corresponding to one signal, and wherein said second analysis means is arranged to alter the gain of each of said plurality of amplifiers independent from every other of said plurality of amplifiers.

13. A device according to claim 1, wherein said amplified signal is arranged to pass a low pass filter arranged to remove disturbances before being received by said second analysis means.

14. A method for analysing a performance of a engine, comprising the steps of:
    a) measuring an ion current in a engine and producing a first signal corresponding to said ion current;
    b) delivering said first signal to an amplifier for creating an amplified signal;
    c) analysing said amplified signal for detecting a knock event in the engine, wherein said first signal is arranged to also include low frequencies; and
    d) performing an analysis of said amplified signal and adjusting a gain of said amplifier as a result of said analysis.

15. A method according to claim 14, wherein said analysis in step d) is performed by comparing at least one property of said amplified signal with at least one reference value.

16. A method according to claim 15, wherein said reference value describes at least one property of said engine or of a fuel used in said engine.

17. A method according to claim 14, wherein said amplified signal that is used for the analysis in step c) and step d) corresponds to a section of a revolution of a crank shaft of said engine.

18. A method according to claim 14, wherein said amplified signal that is used for the analysis in step c) and step d) corresponds to a section of a revolution of a crank shaft of said engine that corresponds to a time period starting when a piston inside the cylinder (51) is at a top dead center position.

19. A method according to claim 14, wherein said first signal is a plurality of first signals corresponding to ion currents in a plurality of cylinders.

20. A method according to claim 14, wherein said amplified signal passes a low pass filter for removing disturbances before being fed to the second analysis means.

* * * * *